US006134524A

United States Patent [19]

Peters et al.

[11] Patent Number: 6,134,524

[45] Date of Patent: Oct. 17, 2000

[54] METHOD AND APPARATUS TO DETECT AND DELIMIT FOREGROUND SPEECH

[75] Inventors: Stephen Douglas Peters, Pointe Claire; Daniel Boies, Candiac, both of Canada

[73] Assignee: Nortel Networks Corporation, Canada

[21] Appl. No.: 08/950,417

[22] Filed: Oct. 24, 1997

[51] Int. Cl.[7] .................................................. G10L 15/20

[52] U.S. Cl. .......................................... 704/233; 704/248

[58] Field of Search .................................. 704/233, 200, 704/201, 248, 253, 231, 226, 227, 228

[56] References Cited

U.S. PATENT DOCUMENTS

| | | | |
|---|---|---|---|
| 4,696,039 | 9/1987 | Doddington | 381/46 |
| 4,718,096 | 1/1988 | Meisel | 704/253 |
| 4,718,097 | 1/1988 | Uenoyama | 381/46 |
| 4,720,862 | 1/1988 | Nakata et al. | 381/38 |
| 4,742,537 | 5/1988 | Jesurum | 379/351 |
| 4,764,966 | 8/1988 | Einkauf et al. | 381/46 |
| 4,821,325 | 4/1989 | Martin et al. | 381/46 |
| 5,007,000 | 4/1991 | Baldi | 364/513.5 |
| 5,062,137 | 10/1991 | Watanabe et al. | 381/46 |
| 5,276,765 | 1/1994 | Freeman et al. | 395/2 |
| 5,293,450 | 3/1994 | Kane et al. | 395/2.35 |
| 5,323,322 | 6/1994 | Mueller et al. | 364/499 |
| 5,323,337 | 6/1994 | Wilson et al. | 364/574 |
| 5,459,814 | 10/1995 | Gupta et al. | 395/2.42 |
| 5,579,431 | 11/1996 | Reaves | 395/2.23 |
| 5,596,680 | 1/1997 | Chow et al. | 395/257 |
| 5,598,466 | 1/1997 | Graumann | 379/389 |
| 5,617,508 | 4/1997 | Reaves | 395/2.42 |
| 5,627,937 | 5/1997 | Kim | 704/229 |
| 5,644,623 | 7/1997 | Gulledge | 455/423 |

OTHER PUBLICATIONS

Davies et al., ICASSP 88, "Noise Background Normalization For Simultaneous Broadband and Narrowband Detection," vol. 5, pp. 2733–2736, (1988).

Claes et al., ICASSP 96, "SNR–Normalisation For Robust Speech Recognition," p. 331–334.

*Primary Examiner*—Richemond Dorvil

*Attorney, Agent, or Firm*—Finnegan, Henderson, Farabow, Garrett & Dunner, L.L.P.

[57] ABSTRACT

The present invention provides improved foreground-speech signal endpointing by computing a spectral stationarity statistic. This statistic is used by a finite state machine to endpoint speech. Endpointing using the spectral stationarity statistic is less susceptible to background noise than endpointing using conventional measures. The present invention uses frame-synchronous quantile estimation to generate a mask signal for signal to Noise Ratio Normalization.

24 Claims, 7 Drawing Sheets

METHOD AND APPARATUS TO DETECT AND DELIMIT FOREGROUND SPEECH

BACKGROUND

The present invention relates generally to speech recognition. In particular, it relates to speech recognition methods and apparatuses that delimit speech in noisy environments.

The automatic recognition of human speech in arbitrary environments is a difficult task. The problem is yet more difficult when the recognition is to be performed in real time, i.e., the delay between the end of speech and the system response is no more than the speaker might expect in a typical human conversation.

One of the key components of a real time speech recognition system is the ability to reliably detect the start and end of speech. While the best way to do this would involve a feedback path from the speech recognizer itself, it is not feasible to do this in real time using current technology. Because feedback is not a viable option, there is a need for methods and apparatus to determine the start and end of speech in a computationally efficient manner.

Endpointing is one technique that delimits the start and end of speech. Endpointing is difficult, however, when speech is acquired over a telephone network because of system noise. Additionally, the variety of modes and environments in which conventional as well as cellular, cordless, and hands-free telecommunications devices are used all add to the challenge.

The key difficulty in any telecommunication system is the background noise of a telephone call. The background noise can be due to any number of phenomena, including cars, crowds, music, and other speakers. Moreover, the intensity of this background noise can be constantly changing and is impossible to predict accurately.

Currently, telephone-network real-time speech recognition system endpointers are based primarily on the energy in the received signal, which includes the speech and the background noise. They may also use other statistics derived from the received signal including zero-crossings, for more information on zero-crossing see U.S. Pat. No. 5,598,466, issued to David L. Graumann on Jan. 28, 1997, or energy variance, for more information on energy variance see U.S. Pat. No. 5,323,337, issued to Denis L. Wilson et al. on Jun. 21, 1994. The endpointer statistic is fed to a finite state machine, which signals the start and end of speech on the basis of a number of thresholds and timeouts. An example of how such a state machine operates is given in FIG. 1.

FIG. 1 is a flow chart showing the operation of a finite state machine. First, the finite state machine receives an endpointer statistic (step 102). Next, the state machine determines whether the current statistic exceeds a first threshold for a first predetermined amount of time (a first timeout) (step 104). If the determination is negative, steps 102 and 104 are repeated. If the determination is positive, the state machine identifies the beginning of speech (step 106). The state machine then enters the in speech state (step 108). While in the in speech state, the state machine determines whether the statistic falls below a second threshold for a second predetermined amount of time (step 110). If the determination is negative, steps 108 and 110 are repeated. If the determination is positive, the state machine enters a tentative silence state (step 112). During the tentative silence state, the state machine determines whether statistic exceeds the first threshold for the first predetermined amount of time. If the determination is positive, the state machine returns to the in speech state, step 108. If the determination is negative, the finite state machine determines whether the statistic has remained below the first threshold for a third predetermined amount of time (step 116). If the determination is negative, steps 112 to 116 are repeated. Finally, if the determination is positive the state machine identifies the end of speech (step 118). Thus, the speech recognition system performs recognition on only that portion of the input signal between the beginning of speech and the end of speech (i.e., while the state machine is in the in speech state).

Typically, the effectiveness of an endpointer decreases as the intensity of the background noise increases. Loud background noise may cause the endpointer to signal a start of speech too soon or delay the detection of the end of speech. The latter condition can be quite damaging to the performance of a real time speech recognition system. Clearly, the endpointer requires some adaptation to compensate for the background. Therefore, it would be desirable to provide an endpointer that pre-processes the inputted signal in real time so that foreground speech delimitation using a fixed threshold endpointing method is less susceptible to background noise.

SUMMARY OF THE INVENTION

Methods and apparatus consistent with the invention pre-process a channel energy signal to establish a spectral stationarity statistic that an endpointer can use to delimit speech. The spectral stationarity statistic allows an endpointer to perform with less susceptibility to background noise.

To attain the advantages and in accordance with the purpose of the invention, as embodied and broadly described herein, a method consistent with the present invention for processing data in a voice recognition system capable of receiving foreground speech in the presence of background noise, includes the steps of extracting a channel signal, generating a mask signal from the channel signal, masking the extracted channel signal with the mask signal, and taking a sample standard deviation of the masked channel signal over a temporal window.

An apparatus in a voice recognition system capable of receiving foreground speech in the presence of background noise consistent with the present invention comprises means for extracting a channel signal, means for generating a mask signal from the computed channel signal, means for masking the extracted channel signal with the mask signal, and means for taking a sample standard deviation of the masked energy signal over a temporal window.

A method for generating a quantile estimate of a channel signal, comprising the steps of defining a quantile estimate, initializing a plurality of buffers, receiving a channel signal, computing a plurality of differences, adjusting the quantile estimate based on the plurality of differences, and incrementing the plurality of buffers based on the plurality of differences.

Also, an apparatus for generating a quantile estimate of a channel signal, comprising means for defining an initial quantile estimate, means for initializing a plurality of buffers, means for receiving a channel signal, means for computing a plurality of differences, means for adjusting the quantile estimate based on the plurality of differences, and means for incrementing the plurality of buffers based on the plurality of differences.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate preferred embodiments of the invention and, together with the description, explain the goals, advantages and principles of the invention. In the drawings.

Like reference numerals refer to corresponding parts throughout the several figures of the drawings.

DESCRIPTION OF THE PREFERRED EMBODIMENT

Reference will now be made in detail to the present preferred embodiments of the invention, examples of which are illustrated in the accompanying drawings. The matter contained in the description below or shown in the accompanying drawings shall be interpreted as illustrative, and not limiting.

Methods and apparatus consistent with this invention provide improved foreground-speech signal endpointing. To improve endpointing, a spectral stationarity statistic ("$s^3$") is computed. The statistic $s^3$ is more robust to background noise then more conventional measures. Additionally, the statistic $s^3$ can be made even less susceptible to variable background noise by using background normalization.

Figure 2:
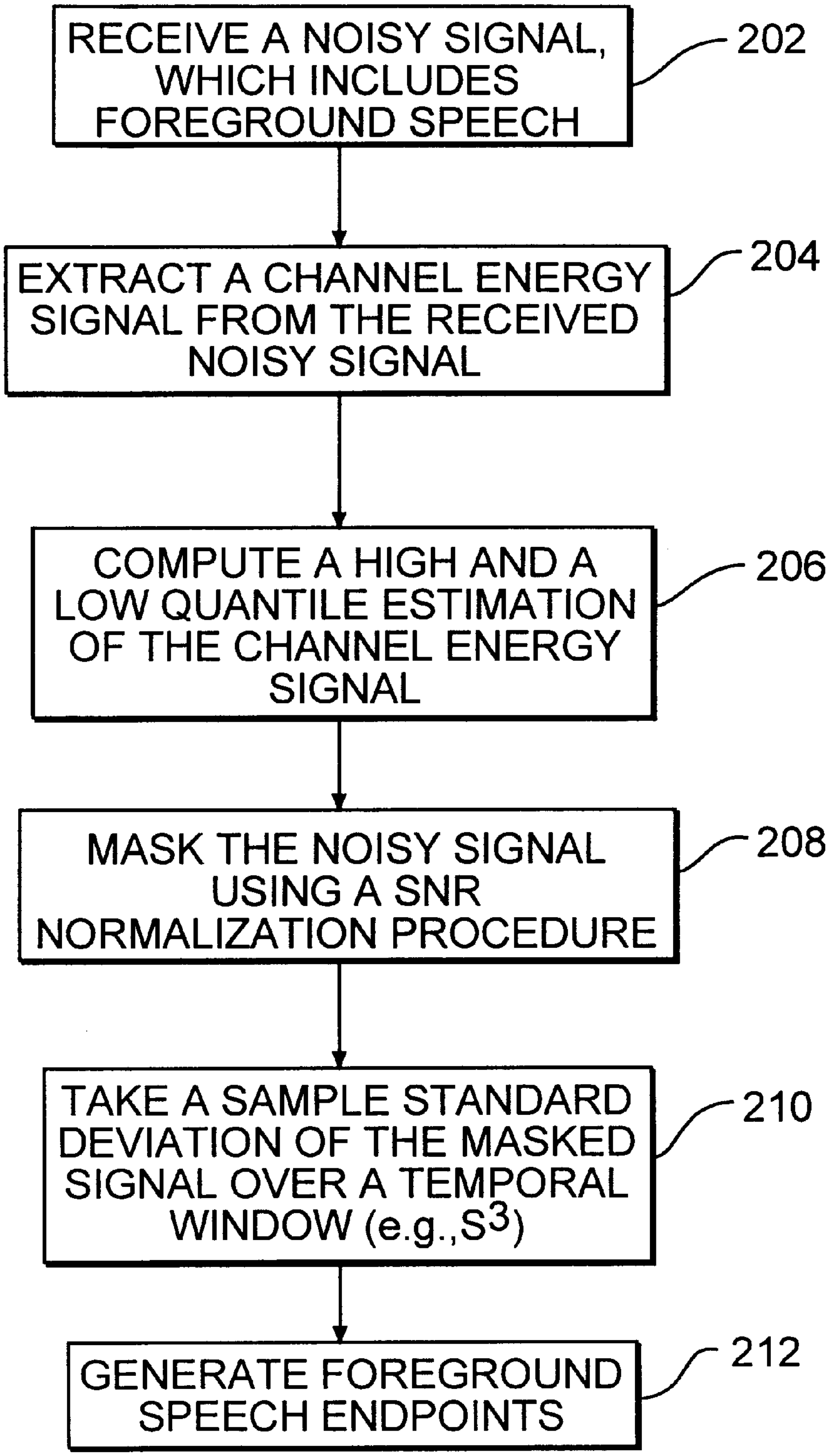
FIG. 2 is a flow chart illustrating a method of preprocessing a noisy signal consistent with the present invention.

FIG. 2 is a flow chart showing a method of pre-processing a received noisy signal to produce the statistic $s^3$ for each frame consistent with the present invention. A frame comprises a series of digital samples of the noisy signal over a pre-determined length of time. First, a pre-endpointer processor receives a noisy signal, which includes foreground speech (step 202). As used in this application, foreground speech refers to that portion of the input signal that is to be recognized by the speech recognization system. Next, using conventional techniques, the pre-endpointer processor extracts a channel energy signal from the received noisy signal (step 204). For simplicity, FIG. 2 only refers to a single recording channel, but multiple recording channels are preferred (i.e, 2, 3, 5, 20, or more channels). As explained in more detail below, the pre-endpointer processor then computes both a high and a low quantile estimation of the channel energy signal (step 206). Using the quantile estimations to generate a mask signal, the noisy signal is masked with the mask signal using a Signal to Noise Ratio ("SNR") normalization procedure (step 208). Finally, the pre-endpointer processor takes a sample standard deviation of the masked signal over a temporal window (step 210). The finite state machine then uses the sample standard deviation, i.e., the statistic $s^3$, in a conventional manner to generate the foreground speech endpoints (step 212).

Figure 1:
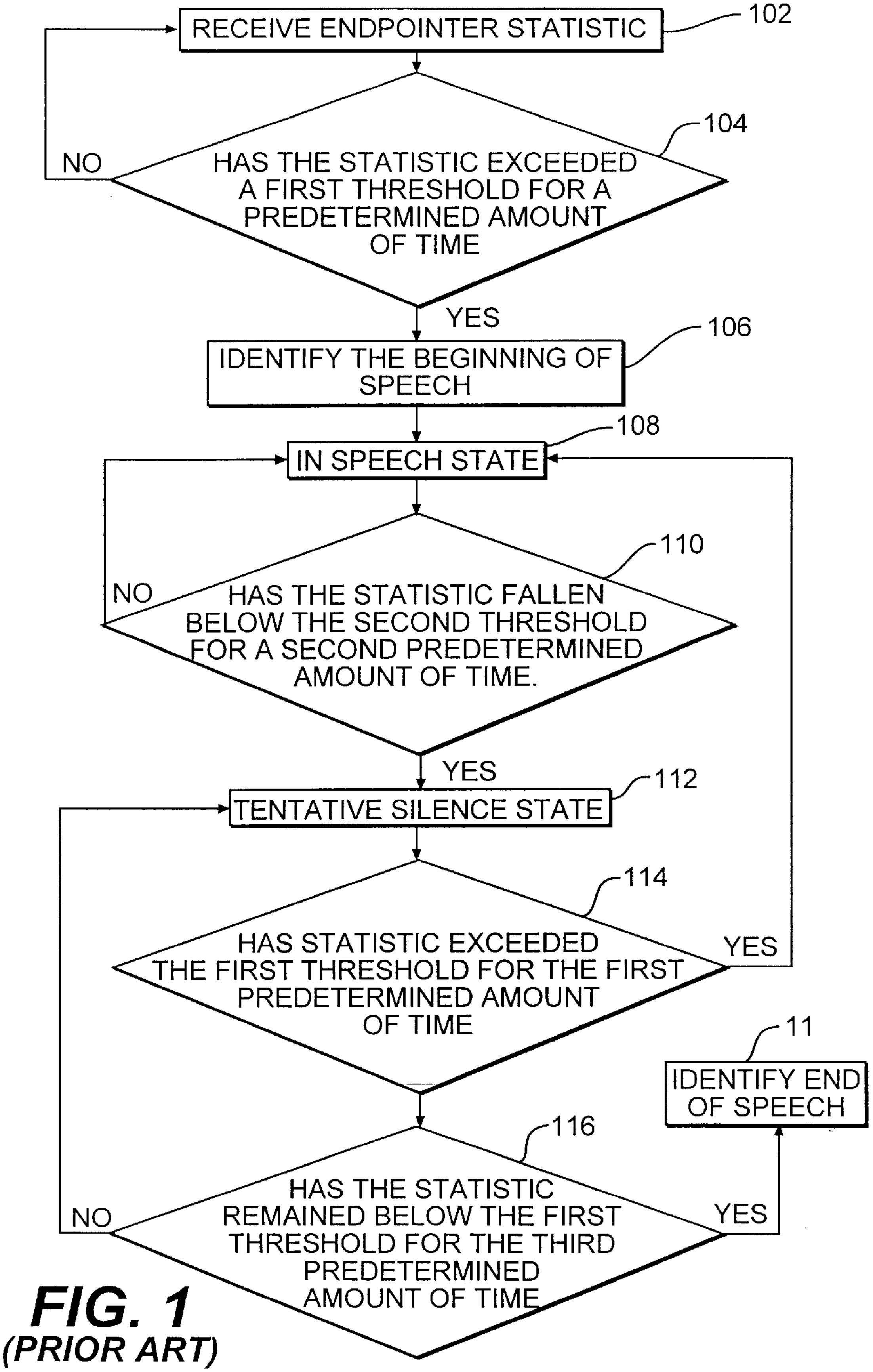
FIG. 1 (PRIOR ART)
FIG. 1 is a flow chart illustrating prior art speech signal endpointing.
Figure 3:
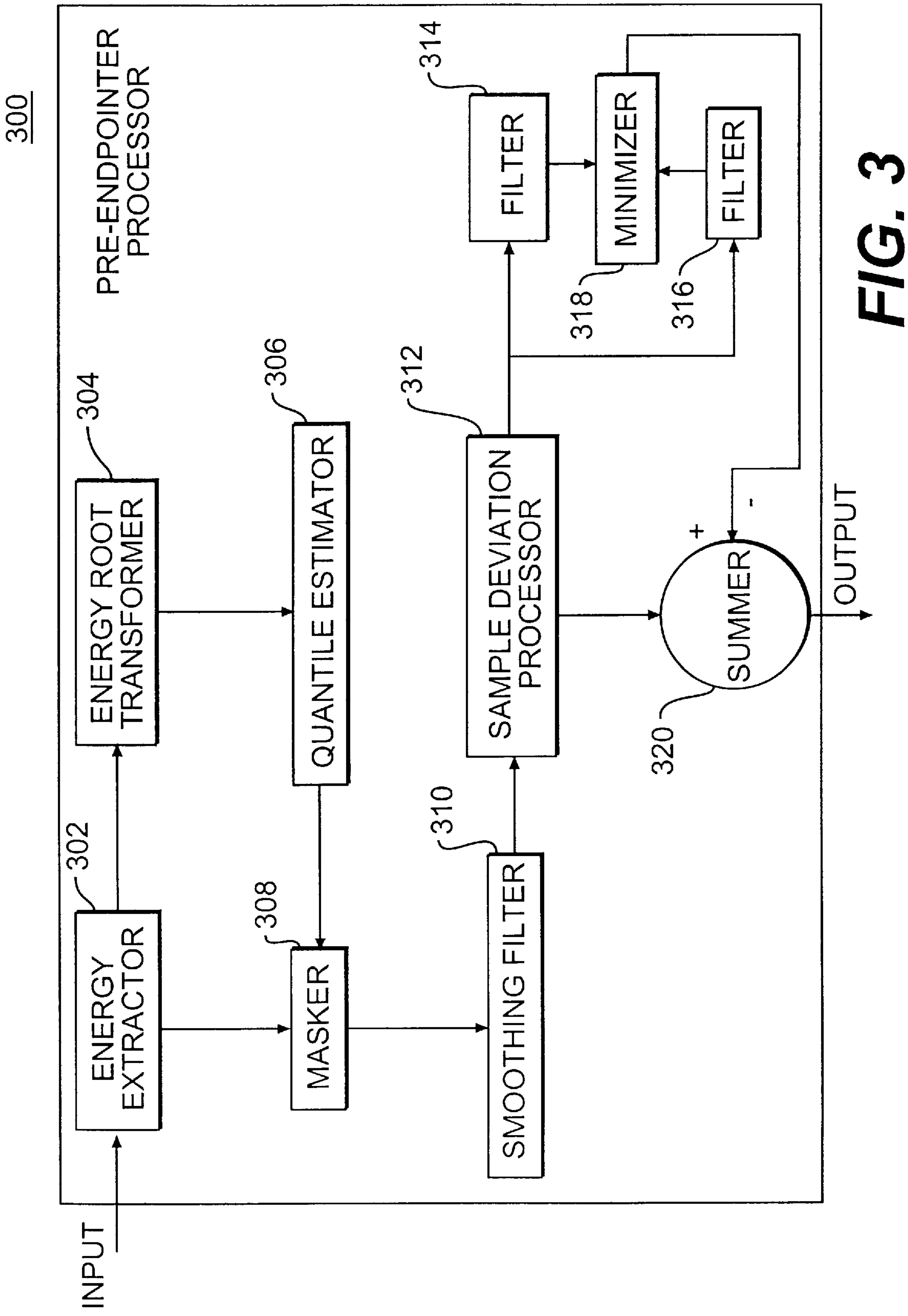
FIG. 3 is a block diagram of a pre-endpointer processor consistent with the present invention.

FIG. 3 is a block diagram of an pre-endpointer processor ("PEP") 300 consistent with the present invention. PEP 300 includes an energy extractor 302, an energy root transformer 304, a quantile estimator 306, a masker 308, a smoothing filter 310, a sample deviation processor 312, two parallel linear filters 314 and 316, a minimizer 318, and a summer 320. As seen in FIG. 3, each recording channel signal is inputted to PEP 300 and received by energy extractor 302. Energy extractor 302 outputs an extracted channel energy signal to energy root transformer 304 and to masker 308. Energy root transformer 304 performs a non-linear root transformation on the extracted channel energy signal and outputs the transformed signal to quantile estimator 306, which computes high and low quantile estimates for the transformed energy signal. Quantile estimator 306 outputs high and low quantile estimate signals to masker 308. Masker 308 uses the quantile estimate signals to generate a mask signal and perform SNR normalization on the channel energy signal outputted from energy extractor 302 (i.e., adds the mask signal to the channel energy signal). Additionally, masker 308 has a memory (not shown) associated with it to save the current mask signal for use in computing the next mask signal. The masked channel energy signal is sent through smoothing filter 310 to sample deviation processor 312, which takes a sample deviation of the masked channel energy signal over a temporal window, as described in more detail below. The sample deviation signal passes through two parallel linear filters 314 and 316 to minimizer 318. Minimizer 318 outputs the lesser of the two filter outputs to summer 320, and summer 320 subtracts the output of minimizer 318 from the sample deviation signal to generate the statistic $s^3$. Finally, the statistic $s^3$ is outputted to the finite state machine, which is embodied in FIG. 1. The state machine uses the statistic $s^3$ in a conventional manner to determine the foreground speech endpoints.

In one embodiment, PEP 300, and its associated components, is implemented in software executed by a processor of a host computer (not shown). In other embodiments, PEP 300 is implemented in circuit hardware, or a combination of hardware and software. When implemented in software, a preferred operating environment is a C-based operating environment.

One of skill in the art would now recognize that the channel energy signals used to calculate the statistic $s^3$ are in the power domain. These energy signals may vary over a large range. The large range over which the channel energy signals exist makes it difficult to take the high and low quantile estimations of the channel energy signal. Energy root transformer 304, therefore, performs a conventional non-linear transformation (Eq. 1) on the channel energy signal to obtain a root channel energy signal ("RCE"). The only requirement of this conventional conversion is that the "root" operator $\gamma$ be predefined such that, as $\gamma$ approaches 0, RCE approaches log CE, where CE is the channel energy signal. This tends to compress the range of the actual channel energies.

$$\text{root } (CE,\gamma) \text{ is defined as } RCE=1/\gamma\cdot(CE^{\gamma}-1) \qquad \text{(Eq. 1)}$$

Figure 4:
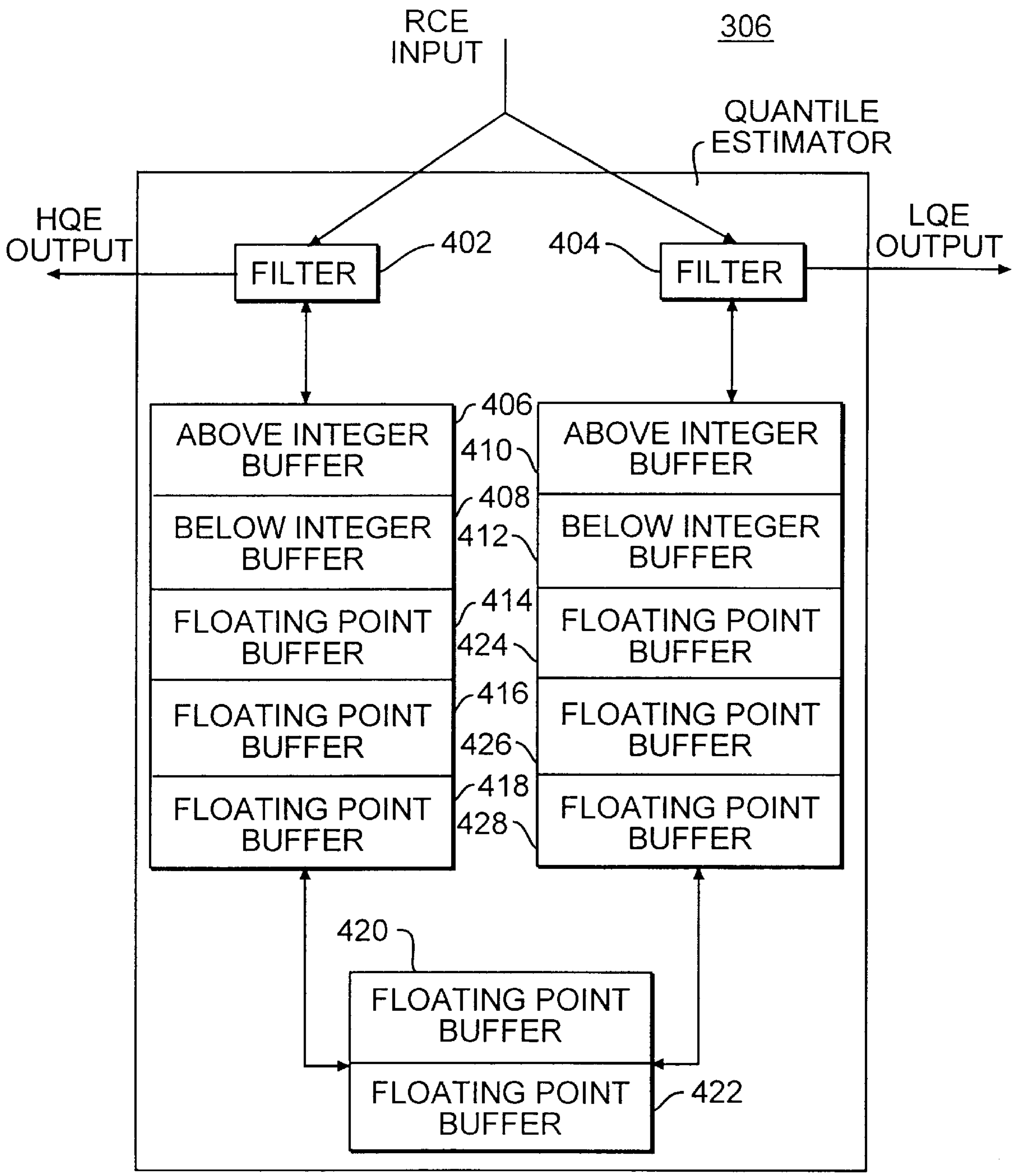
FIG. 4 is a block diagram of the quantile estimator of FIG. 3.

FIG. 4 is a block diagram of quantile estimator 306. For each RCE, quantile estimator 306 comprises two non-linear filters 402 and 404; two above integer buffers (counters) 406 and 410; two below integer buffers 408 and 412 (counters), and eight floating point buffers 414, 416, 418, 420, 422, 424, 426, and 428. As can be seen in FIG. 4, quantile estimator 306 receives RCE at non-linear filters 402 and 404. Non-linear filter 402 communicates with above and below integer buffers 406 and 408, and floating point buffers 414, 416, and 418 to generate the high quantile estimate ("HQE"). Non-linear filter 404 communicates with above and below integer buffers 410 and 412, and floating point buffers 424, 426, and 428, and to generate the low quantile estimate ("LQE").

Figure 5:
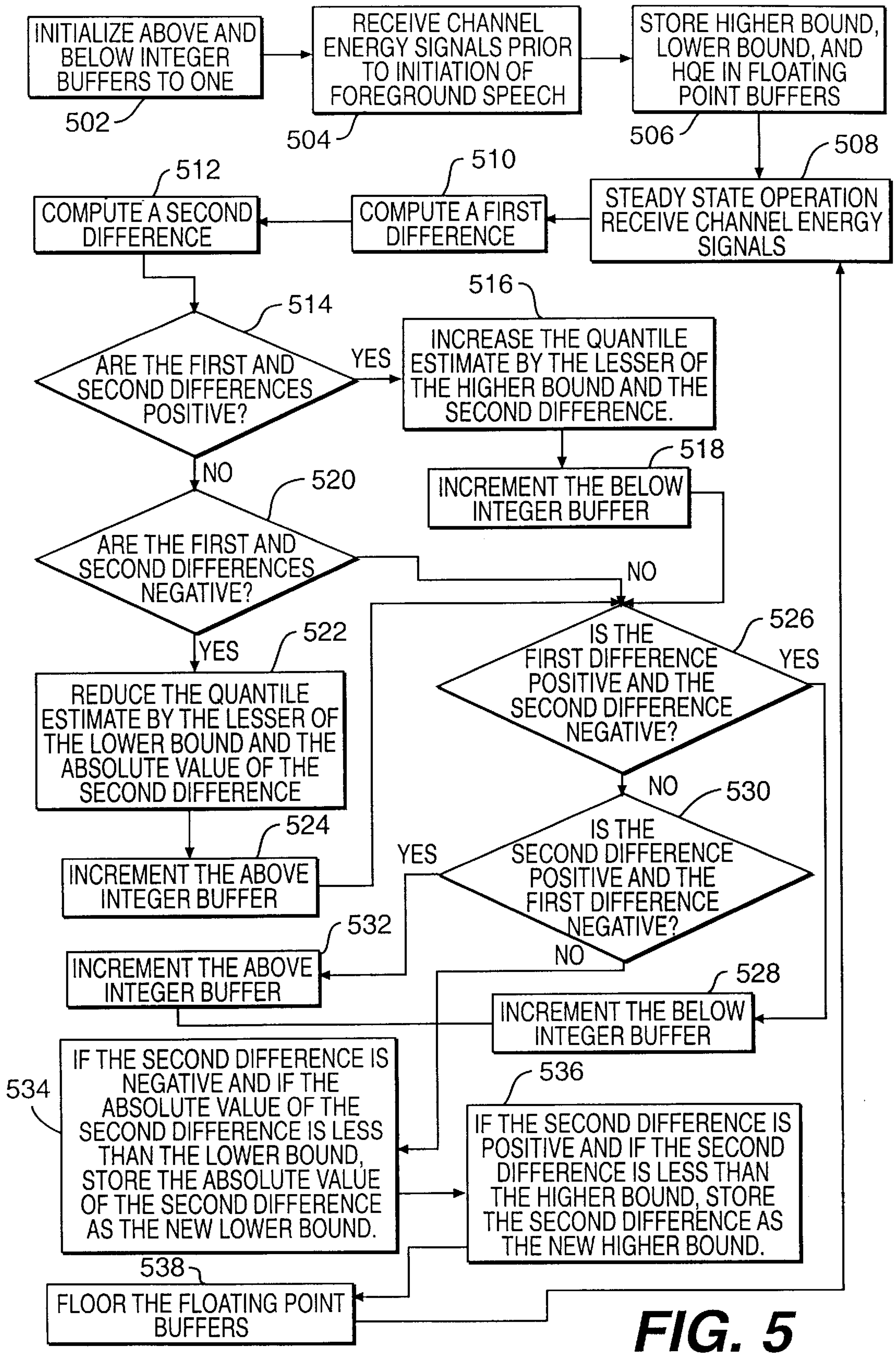
FIG. 5 is a flow chart illustrating a method of computing quantile estimates consistent with the present invention.

FIG. 5 is a flow chart representing how quantile estimator 306 computes HQE. First, above integer buffer 406 and below integer 408 are initialized to a value of one (step 502). Floating point buffers 414, 416, and 418 are initialized by, for example, receiving three frames of channel energy signals prior to the initiation of any foreground speech (step 504). These three frames are classified as a highest, a middle, and a lowest channel energy signal. Quantile estimator 306 stores the highest channel energy signal less the middle channel energy signal in floating point buffer 414 as a higher bound, the middle channel energy signal less the lowest channel energy signal in floating point buffer 416 as a lower bound, and the middle channel energy signal in floating point buffer 418 as an initial HQE (step 506). Quantile estimator 306 uses above integer buffer 406 to count the number of channel energies that are above HQE and below integer buffer 408 to count the number of channel energies that are below HQE. The counting process is described below, in steps 508–538. Because the middle channel energy is set to be HQE, above and below integer buffers 406 and 408, respectively, are set to a value of 1, which indicates one channel energy signal is above HQE and one channel energy signal is below HQE. Once the initialization portion is complete, the quantile estimator runs in steady-state mode. Although steps 508–538 are shown as a discrete series of steps, during steady state operation the process is continual in nature.

In the steady state, quantile estimator 306 continually receives root channel energy signals (step 508). The HQE output from the quantile estimator 306 depends on two differences. The first difference is the quantile target ratio subtracted from the ratio between the above integer buffer 406 and the below integer buffer 408 (step 510). The quantile target ratio is determined from a predetermined quantile specification. For example, if the quantile specification is fifty percent, the target ratio would be unity (i.e., for every sample above the estimate, there should be one below). If the quantile specification were ninety percent, the target ratio would be 1:9.

The second difference is the previous quantile estimate stored in floating point buffer 418 subtracted from the current channel energy sample stored in filter 402 (step 512). If both of the differences are positive (step 514), the quantile estimate is increased by the lesser of the higher bound stored in floating point buffer 414 and the second difference (step 516) and the below integer buffer 408 is incremented (step 518). Similarly, if both of the differences are negative (step 520) the quantile estimate stored in floating point buffer 418 is reduced by the lesser of the lower bound stored in floating point buffer 416 and the absolute value of the second difference (step 522) and the above integer buffer 406 is incremented (step 524).

If the first difference is positive and the second difference is negative (step 526), the below integer buffer 408 is incremented (step 528). If the second difference is positive and the first difference negative (step 530), increment the above integer buffer (step 532). Also, if the second difference is negative and the absolute value of the second difference is less than the lower bound stored in floating point buffer 416, then the second difference is stored in floating point buffer 416 as the new lower bound (step 534). Additionally, if the second difference is positive and the second difference is less than the higher bound currently stored in floating point buffer 414 then the second difference is stored in floating point buffer 414 as the new higher bound (step 536). After all these test and adjustments, the floating point buffers 414 and 416 are floored so that they are not permitted to vanish (step 538). Steps 508 to 538 are repeated as long as the state machine is on-line. The LQE is determined in a manner similar to determining HQE outline above. In the preferred embodiment of this invention, the HQE is a quantile estimator with a quantile specification of ninety percent, i.e., target ratio of 1:9, and the LQE is a quantile estimator with a quantile specification of ten percent, i.e., target ratio of 9:1.

The remaining two floating point buffers 420 and 422, which are shared between the HQE and LQE, are used to store the maxima and minima of the channel energy. The absolute differences between these values and the quantile estimate are used to regulate the bounds. In the preferred embodiment of this invention the floor on the higher bounds stored in floating point buffers 414 and 424 are one quarter of the ratio between the difference of the maximum stored in floating point buffer 420 and the quantile estimates stored in floating point buffers 418 and 428 and the above integer buffer 406 and 410. Similarly, the floor on the lower bound stored in floating point buffer 416 and 426 is one quarter of the ratio between the difference of the quantile estimate stored in floating point buffers 418 and 428 and the minimum stored in floating point buffer 422 and the below integer buffers 408 and 412.

Figure 6:
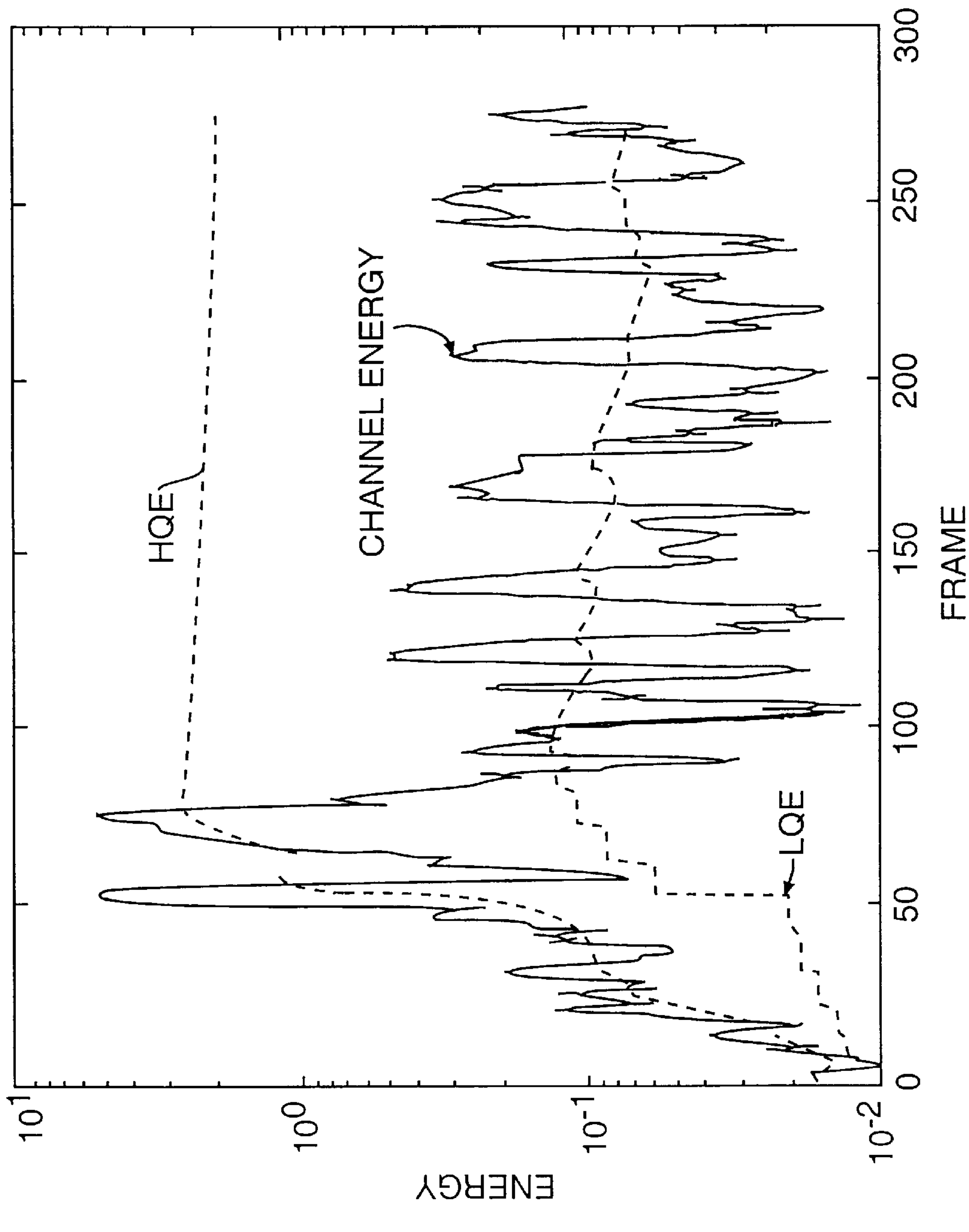
FIG. 6 is a graphical representation of the high and low quantile estimates in relation to the channel energy.

FIG. 6 is a graphical representation of a channel energy signal and HQE and LQE generated from the channel energy signal. As can be seen in FIG. 6, HQE and LQE are adjusted for every frame based, in part, on what the quantile estimates should have been for the immediately preceding frame. One of ordinary skill in the art will now recognize that the quantile estimator has many applications, of which only one is outlined above.

Once generated, masker 308 uses HQE and LQE to generate a mask signal in a manner analogous to (Eq. 2), $$\frac{HQE+\mu_t}{LQE+\mu_t}=\text{Target} \qquad \text{(Eq. 2)}$$

where $\mu_t$ equals the mask signal and Target equals a predetermined threshold. Preferably Target is set to make the distance between high and low quantile estimates and the channel energy equal. Not only do HQE and LQE effect $\mu_t$ but $\mu_t$ also depends upon a previously computed $\mu_{t-1}$ where $\mu_t$ equals the instantaneous mask signal and $\mu_{t-1}$ equals the previously computed mask signal (Eq. 3), $$\mu_t=\max\left\{\frac{\text{root}^{-1}(HQE)-(\text{Target})\text{root}^{-1}(LQE)}{\text{Target}-1},\ (\beta\cdot\mu_{t-1}),\ \mu_{\min}\right\} \qquad \text{(Eq. 3)}$$

where β is a preset forgetting factor, close to but less than unity, and $\mu_{min}$ is a lower bound on the mask signal, close to or equal to zero.

Masker 308 adds the mask signal $\mu_t$ to the extracted channel energy signal to obtain a masked channel energy signal ("MCES") (Eq. 4).

$$MCES=\text{root}\left(\frac{CE+\mu_t}{\text{root}^{-1}(LQE)+\mu_t},\ \gamma\right) \qquad \text{(Eq. 4)}$$

For more information regarding SNR-normalization see Tom Claes and Dirk Van Compernolle, SNR-NORMALISATION FOR ROBUST SPEECH RECOGNITION, ICASSP 96, pp 331–334, 1996 ("Claes"). While Claes identifies the general SNR normalization procedure, mask signals consistent with the present invention are significantly different. The SNR normalization in Claes, for example, predictively estimates the mask signal by tracking the maxima and minima of the instantaneous SNR. Conversely, methods consistent with the present invention use quantile approximation, or its equivalent, to generate the target mask signal. Thus, instead of predictively estimating the mask signal, methods consistent with the present invention determine what the mask signal for the previous frame should have been and correspondingly adjusts the instantaneous mask signal.

Figure 7:
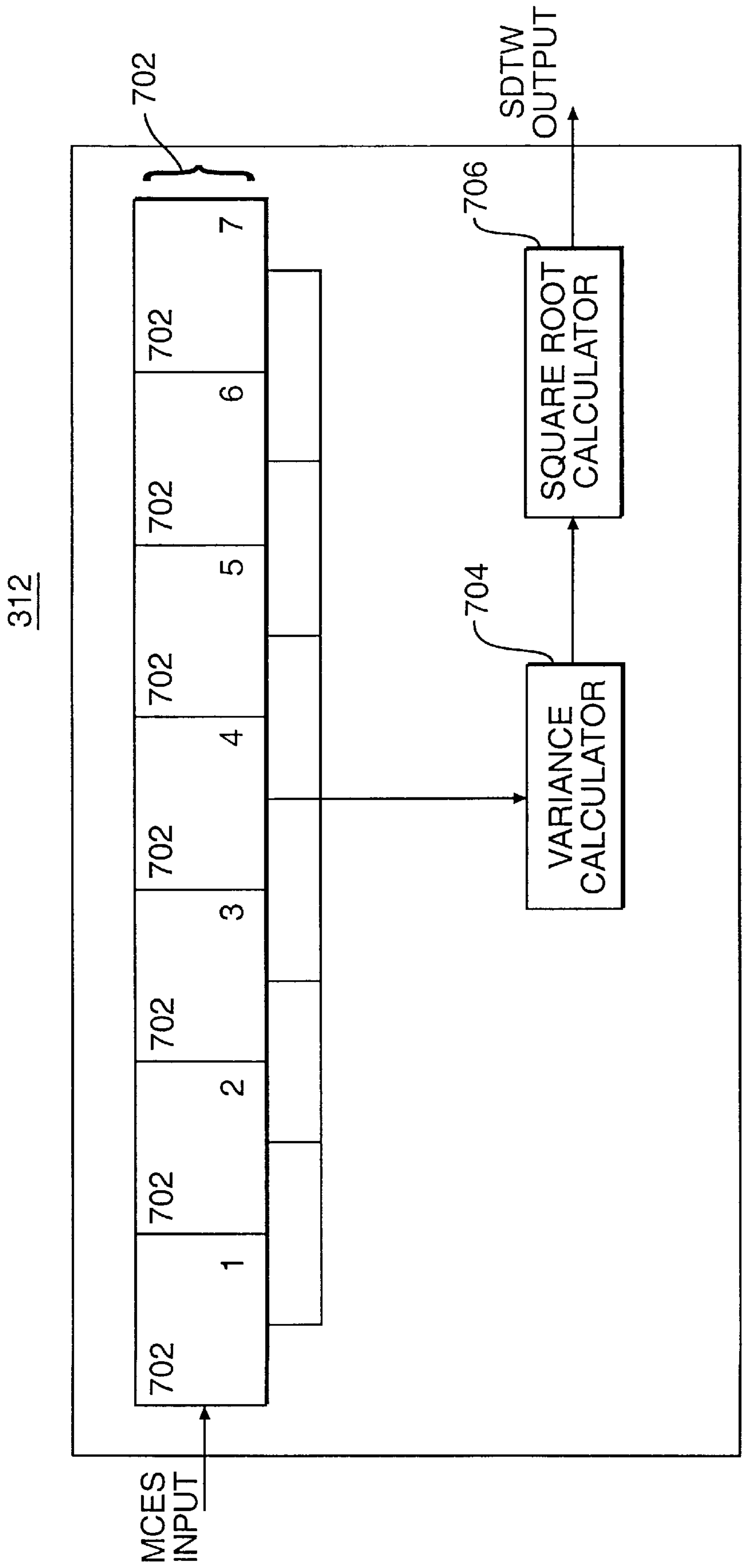
FIG. 7 is a block diagram of the sample deviation estimator of FIG. 3.

The MCES is fed through smoothing filter 310, which is a conventional three-tap FIR smoothing filter, into sample deviation processor 312. FIG. 7 is a block diagram of sample deviation processor 312. Sample deviation processor 312 comprises a delay shift register 702, a variance calculator 704, and a square root calculator 706. Delay shift register 702 has seven register slots $702_{1\text{-}7}$. The instantaneous MCES is inputted to register slot $702_1$, the contents of register slots $702_{1\text{-}6}$ are shifted up one register slot (i.e., the contents of $702_1$ are transferred to $702_2$, etc.), and the content of register slot $702_7$ is discarded. Thus, each register slot $702_{1\text{-}7}$ stores an associated $MCES_{1\text{-}7}$. Variance calculator 704 computes the variance between the MCESs stored in delay shift resister 702 and square root calculator 706 takes the square root of the variance (Eq. 5) the output is the sample standard deviation over the temporal window ("SDTW").

$$SDTW = \left\{(1/6)\left[\sum_{k=1}^{7}(MCES_k)^2 - (1/7)\left(\sum_{k=1}^{7} MCES_k\right)^2\right]\right\}^{1/2} \quad \text{(Eq. 5)}$$

For more information see U.S. Pat. No. 5,579,431 and 5,617,508, issued to Benjamin K. Reaves on Nov. 26, 1997 and Apr. 1, 1997, respectively. A sample deviation processor can calculate the variance over any number of stored MCESs, but the use of the current value and the six previous values is satisfactory. Preferably, SDTW is computed for each recording channel energy signal level. Sample deviation processor 312 combines the SDTWs into a "frame-synchronous scalar statistic." This combined process includes developing an Average SDTWs and a Weighted Average SDTW. Assuming twenty recording channels, the Average SDTW is simply adding each of the twenty SDTW and dividing by twenty (Eq. 6), where i is the recording channel.

$$\text{Average } SDTW = \left(\sum_{i=1}^{20} SDTW_i\right) \Big/ 20 \quad \text{(Eq. 6)}$$

The Weighted Average SDTW can vary depending on the application, but lends a greater significance to the higher frequency channels. The Weighted Average SDTW is determined by assigning a Weight Factor (WF) to each channel and multiplying the SDTW by the WF for each channel. The sum of all the WFs will equal twenty. The Weight Adjusted SDTWs are summed and divided by twenty (Eq. 7).

$$\text{Weighted Average } SDTW = \left(\sum_{i=1}^{20} (WF_i)(SDTW_i)\right) \Big/ 20 \quad \text{(Eq. 7)}$$

The frame-synchronous scalar statistic is the greater of the Weighted Average SDTW and the average SDTW. Although it is preferable to have twenty recording channels, more or less could be used depending on system characteristics.

The frame-synchronous scalar statistic could be used by the endpointer to delimit speech in the conventional manner. It is preferred, however, to apply background normalization to the frame-synchronous scalar statistic. Background normalization comprises filtering the frame-synchronous scalar statistic using separate and parallel linear filters 314 and 316 (FIG. 3). Filter 314 is a conventional one-pole filter with a preset number of frame delays, i.e., a previous background estimator. Filter 316 is a conventional non-causal rectangular impulse response FIR filter that estimates a preset number of frames ahead, i.e., an advanced background estimator. Preferably, the number of frames filters 314 and 316 deviate from the current frame is equal. Adequate background normalization can be achieved with a three frame deviation. For more information regarding the background normalization procedure see Davies & Knappe, NOISE BACKGROUND NORMALIZATION FOR SIMULTANEOUS BROADBAND AND NARROWBAND DETECTION, ICASSP 1988, pp. 2733–36 ("Davies et al."). While similar to Davies et al., one of ordinary skill in the art would now recognize that background normalization methods and apparatuses consistent with the present invention need to be modified, because the signal of interest is neither broadband or narrowband noise. Satisfactory background normalization can be achieved, however, by removing the minimum of filters 314 and 316 from the frame-synchronous scalar statistic to achieve the statistic $s^3$.

It will be apparent to those skilled in the art that various modifications and variations can be made in the methods and apparatus consistent with the present invention without departing from the scope or spirit of the invention. Other modification will be apparent to those skilled in the art from consideration of the specification and practice of the invention disclosed herein. The specification and examples should be considered as exemplary only, with the true scope and spirit of the invention being indicated by the following claims.

What is claimed is:

1. A method for processing data in a voice recognition system capable of receiving foreground speech in the presence of background noise, comprising the steps, performed by a processor, of extracting a channel signal;

generating a mask signal from the channel signal;

masking the extracted channel signal with the mask signal; and taking a sample standard deviation of the masked channel signal over a temporal window; and generating foreground speech endpoints using the sample standard deviation determined during said taking step.

2. The method of claim 1, wherein the extracting step extracts a channel energy signal.

3. The method of claim 2, further comprising the step of:

performing a background normalization on the sample standard deviation.

4. The method of claim 3, wherein the step of performing background normalization comprises the substeps of:

filtering the masked channel energy signal to produce an estimated background signal; and subtracting the estimated background signal from the masked channel energy signal.

5. The method of claim 4, wherein the step of filtering comprises the substeps of:

filtering the masked signal using a previous background estimator;

filtering the masked signal using an advanced background estimator; and selecting the minimum of the filtered masked signals as the estimated background signal.

6. The method of claim 2, wherein generating the mask signal includes the substeps of:

storing a previous mask signal; and generating the mask signal from the channel signal and the stored previous mask signal.

7. The method of claim 2, further comprising the step of:

computing a high quantile estimation and a low quantile estimation.

8. The method of claim 7, wherein the step of generating the mask signal includes the substep of:

equalizing the separations between the computed high quantile estimate and the extracted channel energy signal and between the computed low quantile estimate and the extracted channel energy signal.

9. The method of claim 2, wherein the step of masking the extracted channel energy signal includes the substep of:

adding the generated mask signal to the extracted channel energy signal.

10. The method of claim 2, further comprising the step of:

smoothing the masked channel energy signal.

11. The method of claim 10, further comprising the step of:

taking a square root of the variance.

12. The method of claim 2, wherein the step of taking the sample standard deviation comprises the substeps of:

storing a plurality of previously taken masked signal values in a buffer;

replacing a least current of the plurality of masked signal values with the current masked signal value; and computing the sample variance between the plurality of masked signal values stored in the buffer.

13. The method of claim 2, further comprising the step of:

transforming the extracted channel energy signal.

14. The method of claim 13, wherein the transforming step includes taking a generalized logarithm (root) of the extracted channel energy signal.

15. An apparatus in a voice recognition system capable of receiving foreground speech in the presence of background noise, comprising:

means for extracting a channel signal;

means for generating a mask signal from the channel signal;

means for masking the extracted channel signal using the generated mask signal; and means for taking a sample standard deviation of the masked channel signal over a temporal window, and means for generating foreground speech endpoints using the sample standard deviation determined by said means for taking.

16. The apparatus of claim 15, wherein the extracting means extracts a channel energy signal.

17. The apparatus of claim 15, further comprising:

means for performing a background normalization on the sample standard deviation.

18. The apparatus of claim 15, further comprising:

a smoothing filter.

19. The apparatus of claim 15, further comprising:

means for computing a high quantile estimate and a low quantile estimate.

20. The apparatus of claim 15, further comprising:

means for generating a background estimate signal; and means for subtracting the background estimate signal from the sample standard deviation.

21. The apparatus of claim 15, wherein the means for generating a background estimate signal comprises:

a previous background estimator;

an advance background estimator; and a minimizer to output the minimum of the previous background estimator and the advance background estimator as the background estimate signal.

22. A computer program product comprising:

a computer usable medium having computer readable code embodied therein for processing data in a voice recognition system, the computer usable medium comprising an extracting module configured to extract a channel energy signal;

a mask generating module configured to generate a mask signal from the channel energy signal;

a masking module configured to mask the extracted channel energy signal with the generated mask signal; and a standard deviation module configured to take a sample standard deviation of the masked extracted channel energy signal over a temporal window, and an end point generating module configured to generate foreground speech endpoints using the sample standard deviation determined by said standard deviation module.

23. The computer program product of claim 22, further comprising:

a background normalization module configured to perform background normalization on the sample standard deviation.

24. The computer program product of claim 22, further comprising:

a computing module configured to compute a high quantile estimation and a low quantile estimation.

* * * * *